May 3, 1927.

L. G. RILEY ET AL 1,627,340

CONTROL APPARATUS

Filed May 17, 1920

WITNESSES:
H. B. Funk
W. R. Coley

INVENTORS
Lynn G. Riley, Harry R. Meyer,
Howard H. Johnston and
Jan M. van Nieukerken.
BY
Wesley G. Carr
ATTORNEY May 3, 1927.

L. G. RILEY ET AL 1,627,340

CONTROL APPARATUS

Filed May 17, 1920    5 Sheets-Sheet 2

WITNESSES:
H. B. Funk
W. R. Coley

INVENTORS
Lynn G Riley, Harry R Meyer,
Howard H. Johnston and
Jan M. van Nieukerken.
BY
Wesley G. Carr
ATTORNEY May 3, 1927.

L. G. RILEY ET AL 1,627,340

CONTROL APPARATUS

Filed May 17, 1920

WITNESSES:
H. B. Funk.
W. R. Coley

INVENTORS
Lynn G. Riley, Harry R. Meyer,
Howard H. Johnston and
Jan M. van Nieukerken
BY
Wesley G. Carr
ATTORNEY Patented May 3, 1927.

1,627,340

UNITED STATES PATENT OFFICE.

LYNN G. RILEY AND HARRY R. MEYER, OF WILKINSBURG, HOWARD H. JOHNSTON, OF EDGEWOOD PARK, AND JAN M. van NIEUKERKEN, OF WILKINSBURG, PENNSYLVANIA, ASSIGNORS TO WESTINGHOUSE ELECTRIC & MANUFACTURING COMPANY, A CORPORATION OF PENNSYLVANIA.

CONTROL APPARATUS.

Application filed May 17, 1920. Serial No. 381,980.

Our invention relates to control apparatus and it has special relation to attachments for platform controllers of the well-known "K" type for electric railway vehicles.

One object of our invention is to provide a structure of the above-indicated character which may be readily attached to "K" controllers of many existing types to ensure a proper sequence of operation of the controller with respect to a line switch, whereby all arcing and burning of the controller segments and fingers, during both forward and backward movement of the controller, may be avoided.

Another object of our invention is to provide an apparatus of the class under consideration which shall be readily accessible for inspection or repairs by reason of the fact that it is mounted on the top of the controller case.

A further object of our invention is to provide a switching attachment of the type set forth which comprises a self-contained unit of relatively small size and regular contour which may be installed as a unit between the controller shaft and the usual operating handle.

More specifically stated, one object of our invention is to provide a switching attachment for "K" controllers embodying a pair of interlocking dogs that are respectively associated with the control-drum shaft and the operating handle to permit a predetermined degree of relative or lost motion, thus ensuring that the line switch shall be so operated as to take all the arcing and burning incident to the closure and opening of the motor circuits.

Viewed from another angle, it is an object of our invention to provide the interlocking-dog structure, as specified above, for carrying certain contact segments and, in addition, a control finger that is located between the two dogs for effecting another circuit connection, as hereinafter more fully described.

A further object of our invention is to provide an automatic locking device, in conjunction with the two dog structures outlined above, for preventing the interlocking dogs from accidentally separating and opening the line switch after closure thereof has been once effected.

Another object of our invention is to provide an apparatus for readily permitting "inching" or "jogging" of the motor without requiring any movement of the control drum proper.

These and other objects of our invention may best be understood by reference to the accompanying drawings, wherein

Fig. 6 to Fig. 17, inclusive, and Figs. 19, 21, 22 and 23 are detail views, either in elevation or in section, of different portions of the structure shown in Fig. 5;

Fig. 18 and Fig. 20 are developed views of a portion of the dog structures previously mentioned;

Fig. 26 is a diagrammatic view of a portion of a motor-control system which serves to indicate the proper circuit arrangement and operating sequence of the contact members embodied in our switching attachment.

Figure 1:
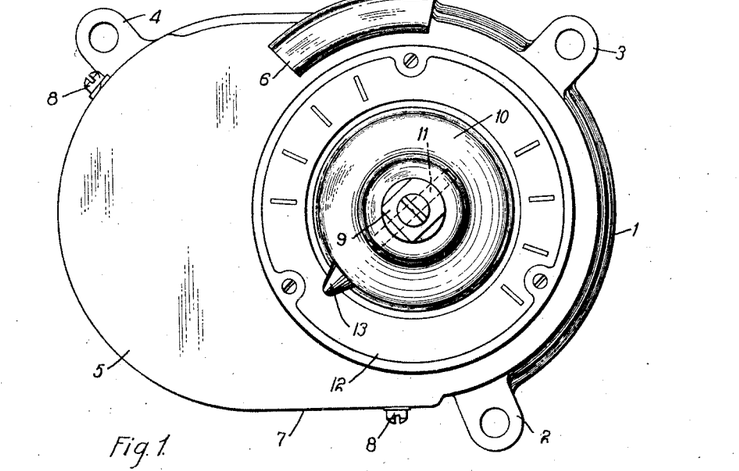
Figure 1 and Fig. 2 are views, respectively in plan and in front elevation, of the complete structure as assembled and installed upon a "K" controller.
Figure 2:
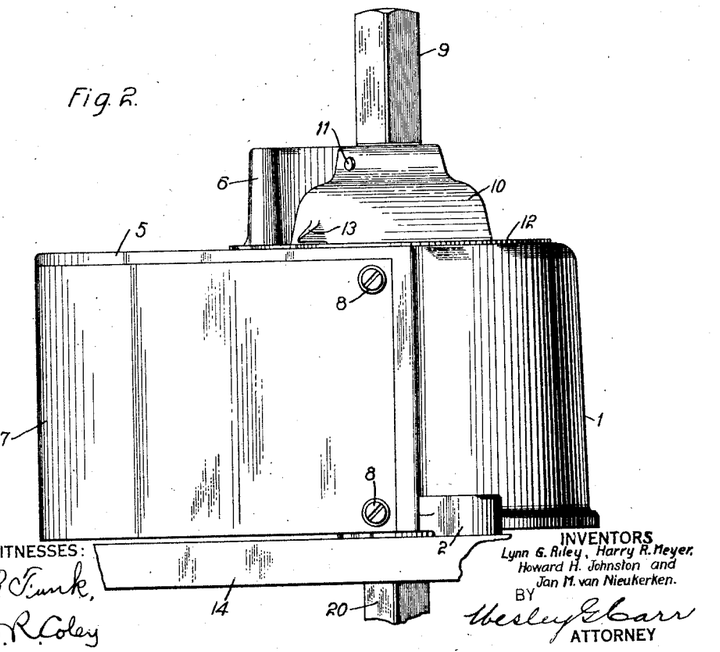

Referring to Figs. 1 and 2 of the drawings, the structure here shown comprises a main casing or control box 1, which is provided, on its lower edge, with a plurality of lugs 2, 3 and 4 for permitting attachment to the usual top cover-plate 14 of a "K" controller 14ª, the top cover member 5 of the switching attachment being preferably formed integral with the encasing member 1. The illustrated structure further comprises a detachable metal side cover 7 which may be secured to the main encasing member 1 by a plurality of tap screws 8; and a short shaft member 9, which extends through a position-indicating member 10 of inverted bowl-shape, to which it is secured by a pin 11, and through a water cap or boss 10ª that is integrally formed with the top cover 5 of the controller casing and encloses a suitable bushing 15. The top cover 5 is further provided with a stop member or curved lug 6 that extends upwardly from the cover plate and is preferably integrally formed therewith for the purpose of limiting the travel of the usual operating handle in both directions, in accordance with a well-known practice. In addition, an indicating disk or plate 12 is secured to the top cover 5 and is so marked as to co-operate with a pointer or toe 13 of the position-indicating member 10 to indicate to the operator the position occupied by the control drum at all times.

The "K" controller may be of a familiar form, having the normal illustrated "off" position and a number of spaced operative positions. Consequently, no further description is deemed necessary here.

Figure 3:
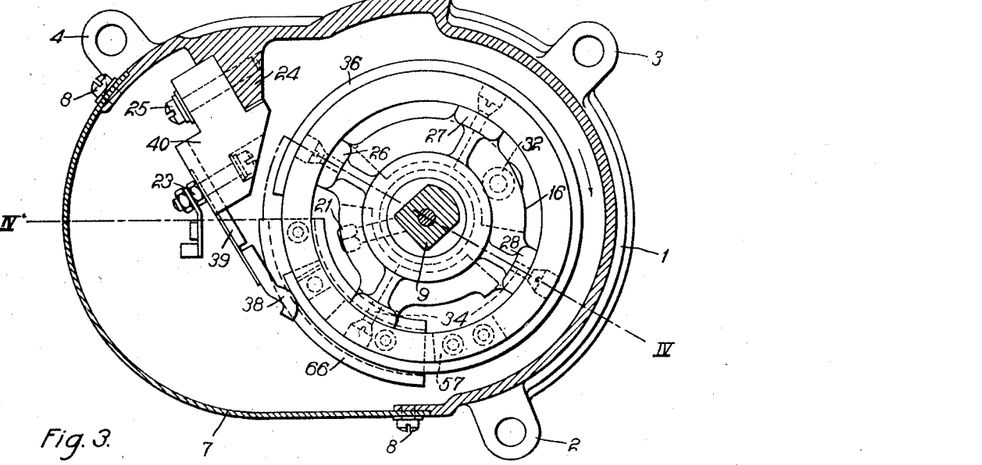
Fig. 3 is a transverse sectional view, taken along the line III—III of Fig. 4.
Figure 4:
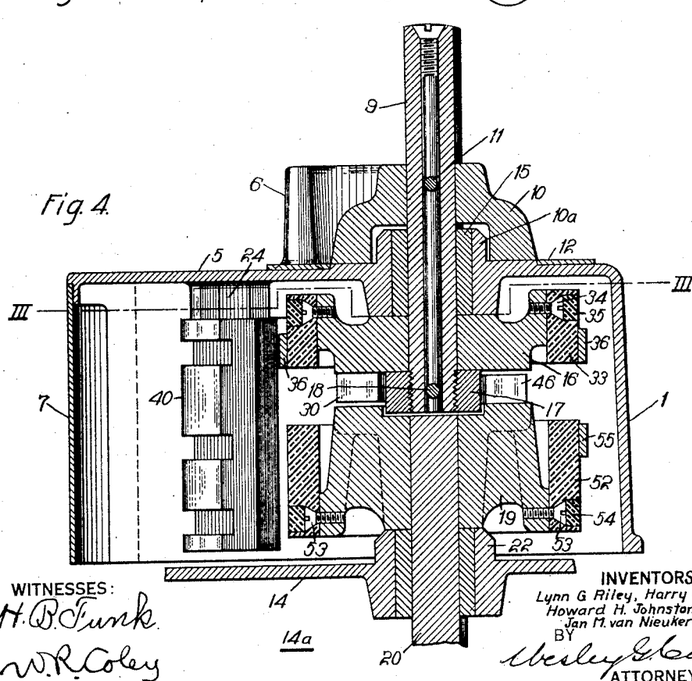
Fig. 4 is a longitudinal sectional view, taken along the line IV—IV of Fig. 3.
Figure 5:
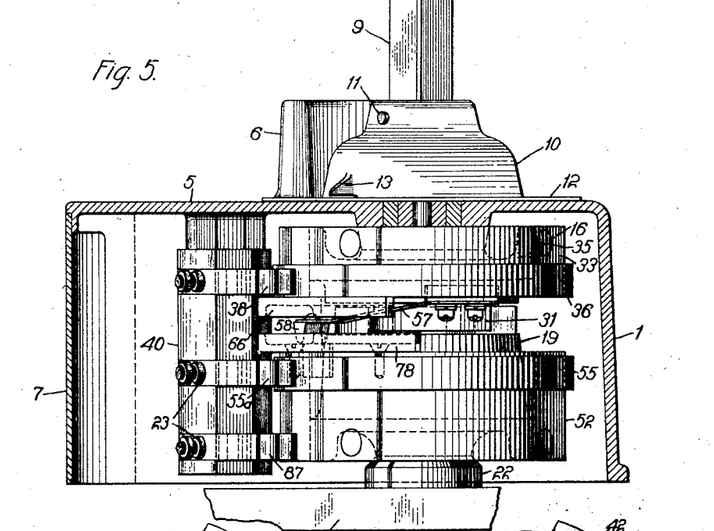
Fig. 5 is an elevational view of the interior parts of our switching attachment, the casing members being shown in section.
Figure 6:
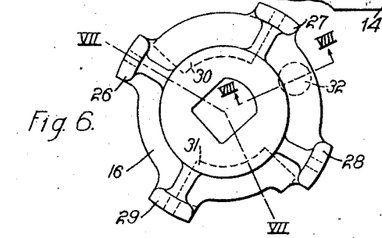
Figures 7, 8, 10:
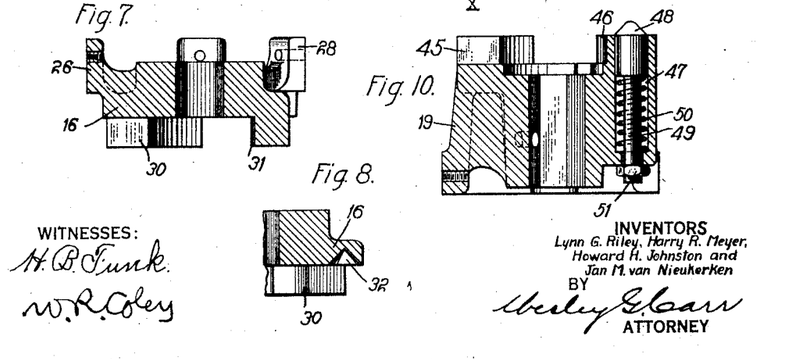

Referring to the structure within the encasing member, as shown in Figs. 3, 4 and 5, a dog member or cylindrical casting 16, which is shown in detail in Figs. 6, 7 and 8, is attached to the shaft 9 to be actuated thereby at all times. The dog 16 may be pinned to the shaft 9 or may be simply provided with an aperture of the same general rectangular shape as the shaft 9, whereby, in either case, relative motion of the dog and the shaft are prevented. The lower end of the shaft 9 is threaded to receive a nut or tapped collar 17 which abuts against the dog 16 to position it and is itself maintained in position by means of a pin 18 that extends through the shaft 9.

Figure 9:
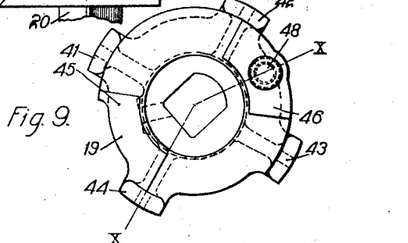

A second or lower dog member or cylindrical casting 19, shown in detail in Figs. 9 and 10, is fitted over the customary drum shaft 20 of the "K" controller, which extends through the controller cover 14 and the water cap or boss 22, in accordance with a common construction. A set-screw 21 serves to rigidly position the dog 19 on the shaft 20.

The upper dog 16, as shown in Fig. 6, for example, comprises a plurality of quadrature-related radially-extending arms or lugs 26, 27, 28 and 29 and a pair of oppositely located interlocking tongues or curved blocks 30 and 31 for purposes to be set forth. In addition, a conical recess 32 is provided in the underside of the dog 16 between the radial lugs 27 and 28, as shown in longitudinal section in Fig. 8. This recess is employed for a locking purpose, as hereinafter described in detail.

Figures 13, 14, 15, 16, 17, 18, 19:
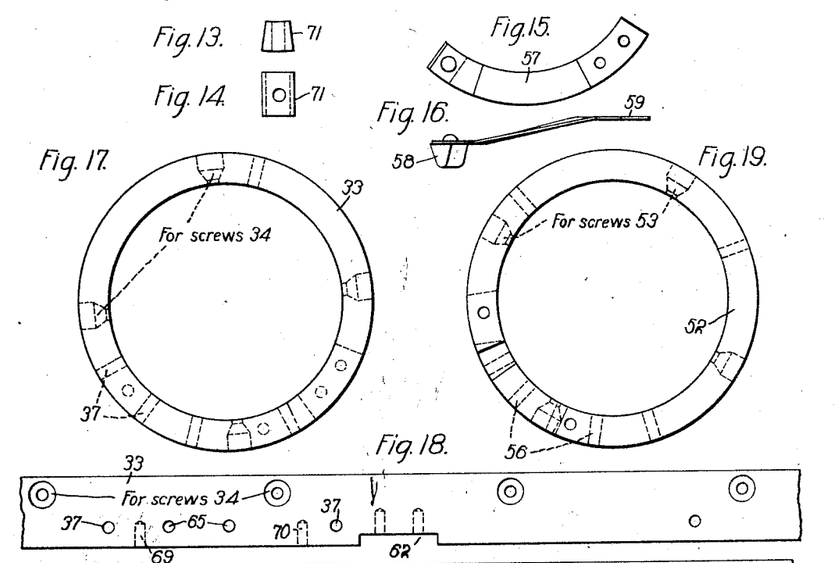

Referring again to Fig. 4, a ring or annular drum 33 of insulating material, such, for example, as a molded composition formed of fibrous material and a binder, and separately shown in plan in Fig. 17 and in development in Fig. 18, is fitted around the dog casting 16, being secured thereto by means of a plurality of screws 34 that extend into the several lugs 26 to 29, inclusive. For the purpose of covering the heads of the screws 34, to prevent grounding of the control apparatus therethrough, a sealing compound 35 is disposed in the outer portion of the screw holes, thus producing an adequately insulated structure.

Figure 12:
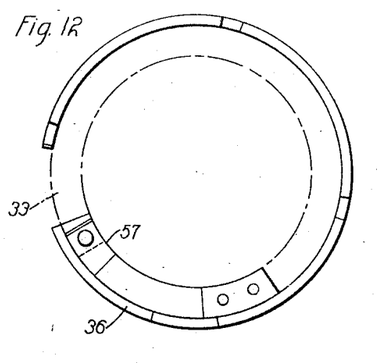
Figure 24:
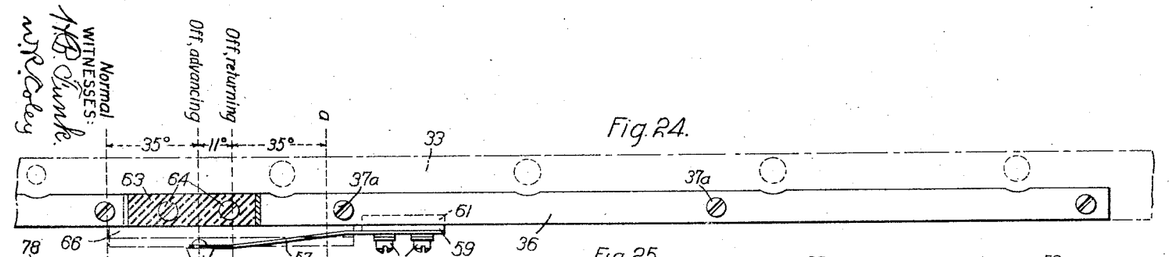
Fig. 24 and Fig. 25 are developed views of the complete dog structures.

A contact strip or segment 36, shown in plan view in Fig. 12 and in development in Fig. 24, is attached to the lower portion of the outer face of the insulating ring 33 by means of a plurality of rivets or pins 37ᵃ which extends into holes 37 in the insulating ring, as indicated in Fig. 18.

Co-operating with the contact segment 36 is a contact finger 38 that is provided with a supporting shank 39, the two members being suitably secured to a finger-board or insulating block 40 by means of a contact bolt 23, the block 40 being itself attached to an internal lug 24 of the encasing member 1 by means of bolts 25.

The lower dog casting 19 comprises a plurality of radially extending arms or lugs 41 to 44, inclusive, as illustrated in Fig. 9, together with a pair of oppositely located depending interlocking tongues or curved blocks 45 and 46 which occupy different positions in the same general plane as the interlocking tongues 30 and 31 of the upper dog 16, and are thus adapted to interlace with them.

The angular space between confronting tongues is preferably about 35°, that is, the upper dog 16 has 35° of free travel before striking the lower dog 19 in the one or the other direction. It should be noted that the various structural figures illustrate our device as occupying the "off" position, corresponding to a forward movement of 35° by the upper dog 16.

In addition, a deep recess 47 is drilled in the upper side of the dog 19, and a pin 48, having a stem 49 of reduced diameter, fits within the recess 47 and extends its conical head a slight distance above the surface of the dog 19, being biased to that position by means of a spiral spring 50 that is coiled around the stem 49. A suitable nut 51, which is threaded on the lower end of the stem 49 and is located on the underside of the dog 19, serves to limit the upward movement of the locking pin 48. This pin is adapted to co-operate with the notch or recess 32 in the upper dog 16, as subsequently described in detail.

Figure 20:
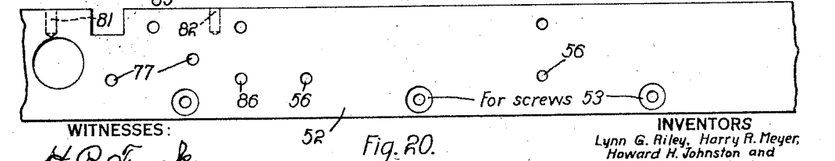

An insulating ring or annular drum structure 52, similar in composition to the insulating drum 33, is disposed around the dog casting 19, being secured thereto by means of a plurality of screws 53 that extend into the radial lugs 41 to 44, inclusive, and which are again insulatedly sealed off by means of suitable insulating material 54. A contact strip or segment 55, shown in development in Fig. 25, encloses the upper portion of the insulating drum 52 for the purpose of engaging an intermediate finger 55ª that is mounted upon the finger-board 40. The contact segment 55 is secured to the drum by means of a plurality of pins or rivets 56ª that extend into holes 56 in the insulating drum, as indicated in Fig. 20.

Fig. 5 shows a contact finger 57, which is illustrated in detail in Figs. 15 and 16, one end of which is provided with a suitable contact tip 58, and the other end 59 of which is secured, by means of screws 60, to a flanged washer 61, or the like, that fits within the groove 62 (Fig. 18), as also shown in the developed view, Fig. 24. In this way, the finger 57 is permanently connected to the contact segment 36. The finger is arcuate in shape and thus is wholly included within the boundaries of the rotatable dogs.

Figure 11:
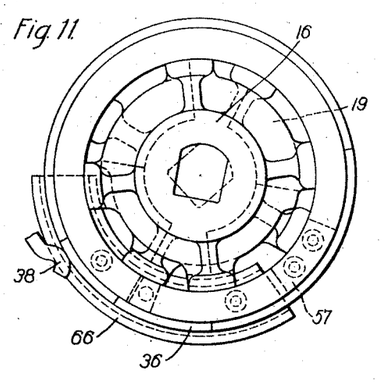

The ends of the contact strip or segment 36 (Figs. 11 and 24) are separated by an insulating strip 63 of similar width and thickness, which is secured to the insulating ring 33 by means of screws 64 that extend into openings 65 (Fig. 18).

Figure 21:
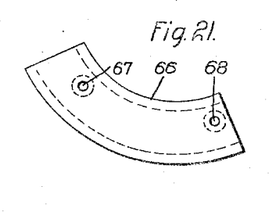

Below the insulating strip 63, another insulating member 66, which is arcuate in plan and channel-shaped in cross-section, (see also Figs. 21 and 23) is secured to the underside of the insulating ring 33 by means of screws which pass through openings 67 and 68 in the insulating member, which openings respectively register with holes 69 and 70 (Fig. 18) in the insulating ring 33.

Figure 25:
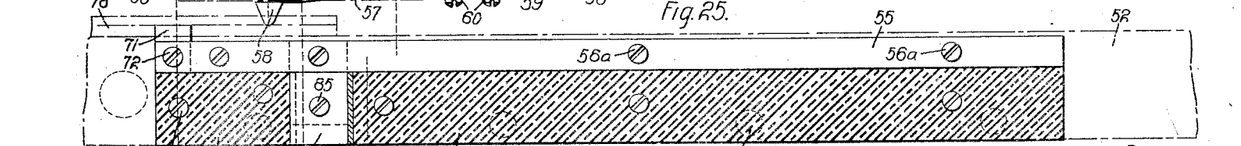

The contact segment 55 on the lower insulating drum 52 has one end secured to a metal block 71, by means of a screw 72, as indicated in Fig. 25, the contact block 71 being shown in detail in Figs. 13 and 14.

A short insulating strip 75 is secured below the metallic block 71 to the insulating ring 52 by means of a plurality of screws 76, that extend into holes 77 (Fig. 20). A longer insulating strip 75ª, of similar width and thickness to the strip 75, is also secured to the insulating drum 52, being separated from the insulating strip 75 by a contact plate or segment 84 which is attached to the insulating ring by means of a screw 85 that extends into a hole 86 (Fig. 20).

Figure 22:
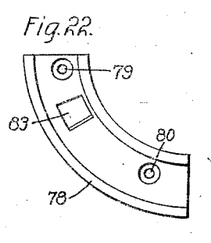

Above the metallic block 71, an insulating member 78 (see also Figs. 22 and 23), of arcuate shape in plan and channel-shaped in cross-section, is secured to the upper side of the upper face of the insulating drum 52 by means of screws that pass through openings 79 and 80 which respectively register with holes 81 and 82 in the insulating ring (Fig. 20). A suitably configured opening 83 is provided in the floor of the insulating member 78 to permit the contact block 71 to extend therethrough and thus be in position to make contact with the tip 58 of the control finger 57.

A third control finger 87 in the auxiliary switching attachment is adapted to engage the contact segment 84 under certain operating conditions, as hereinafter set forth in detail.

It will be seen that we thus provide an auxiliary switching attachment comprising a pair of relatively rotatable and mechanically interlocking members that are respectively adapted for manual operation and for attachment to the main control drum shaft, the rotatable members each carrying a contact segment upon its curved face, while a contact device is disposed between the rotatable members for the purpose of effecting electrical connection between the end surfaces thereof.

Figures 23, 26:
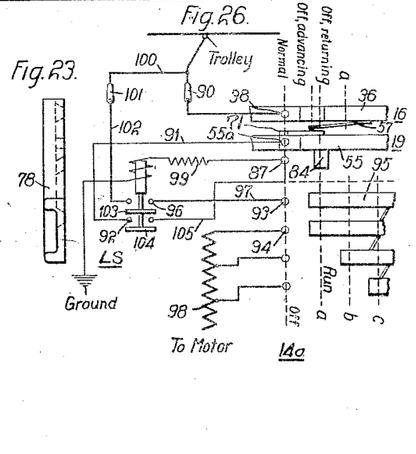

The operation of our invention and the electrical circuits established thereby will now be described. In Fig. 26, the system shown comprises the various contacting members of our auxiliary switching attachment and a portion of those to be found in the "K" controller or main-circuit switching device 14ª. In addition, a supply-circuit conductor, marked "Trolley", a line switch LS and a main motor-circuit or accelerating resistor 98 are shown.

Under normal conditions, that is, when the controller handle has been moved to its extreme position corresponding to the right-hand vertical face of the stop member 6 (Fig. 1), the electrical circuits are organized and arranged as illustrated in Fig. 26, wherein it will be seen that this "normal" position lies a certain distance beyond the line corresponding to the familiar "off" position of drum controllers and, in this particular case, we prefer an angular distance of approximately 35° between the "normal" and the "off" position that corresponds to forward or advancing drum movement. At this time, the control finger 38 engages one portion of the upper contact segment 36, while the control finger 55ª rests upon a portion of the insulating ring 52. Consequently, no circuit is completed, although a live circuit extends as far as the tip of the control finger 57 between the rotatable auxiliary drum members.

Under these conditions, the interlocking tongues upon the confronting end faces of the rotatable dogs 16 and 19 are separated by the above-mentioned angular distance of 35° in the direction to be considered as forward, namely, clockwise when viewing the auxiliary control apparatus from the top, as indicated by the arrow in Fig. 3. This condition of the interlocking dogs is shown in Fig. 26.

Upon forward movement of the auxiliary shaft 9 by the usual control handle (not shown) for a distance of 35°, the customary "off" position of the "K" controller 14ª is reached. Such movement of the auxiliary shaft 9 has effected rotation of the upper dog 16 alone, and, as soon as the tongues 31 and 45 and the tongues 30 and 46 engage, as illustrated in the structural figures, the contact tip 58 of the control finger 57, which is located between the dogs, engages the contact block 71. In this way, the energization of the auxiliary switching attachment extends as far as contact segments 55 and 84, and, in fact, through control finger 55ª to conductor 91 and auxiliary contact finger 92 of the open line switch LS.

Consequently, at this time, the two dogs 16 and 19 are mechanically interlocked, as shown in the structural figures, and continued movement in the forward direction of the auxiliary shaft 9 by the controller handle will effect simultaneous travel of the contact segments 36 and 55 and of the main control drum 14ª.

As soon as the "off" position is reached, a further mechanical action takes place in the nature of the insertion of the pin 48 that is associated with the lower dog 19 into the notch 32 in the confronting end face of the upper dog 16. While this lock is only temporary and may be removed at will by backward actuation of the controller handle, it, nevertheless, serves a useful purpose in preventing the two dogs from becoming accidentally separated by reason of jars caused by the operation of the controller or by the travel of the vehicle. Thus, when once the upper dog 16 has been actuated to the "off" position, corresponding to electrical connection of the upper and lower contact segments 36 and 55, such connection is automatically maintained throughout the remainder of the forward operation of the control apparatus.

Movement of the control apparatus through an angle of approximately 46° from the "off" position to the "run" position, which corresponds to the initial operative position of the "K" controller, first causes the contact segments 95 of the "K" controller to engage with control fingers 93 and 94. In this way, a circuit is established from one stationary contact terminal 96 of the line switch LS through conductor 97, control fingers 93 and 94, which are bridged by contact segment 95 of the "K" controller, and thence through accelerating resistor 98 and the vehicle motor or motors to ground. Consequently, the initial circuit through the "K" controller is completed before the line switch is closed, whereby it is ensured that the arcing incident to completion of the main motor circuit will be taken by the line switch LS.

Such circuit completion is effected as soon as the control apparatus reaches the above-mentioned "run" position, wherein the contact segment 84 of the auxiliary switching attachment engages control finger 87. Under these conditions, a circuit is established from the trolley through auxiliary-circuit hand-switch 90, control finger 88, contact segment 36, control finger 57, contact block 71, contact segments 55 and 84, and control finger 87 of the auxiliary switching device, whence circuit is continued through a suitable resistor 99 and the actuating coil of the line switch LS to ground.

Consequent closure of the line switch completes a main circuit from the trolley through conductor 100, main hand-switch 101 and the contact disk 103 of the line switch to stationary contact terminal 96, whence circuit is completed through the "K" controller, as already traced.

As soon as the line switch LS is closed, a holding circuit therefor is formed from the contact segment 55 on the lower dog 19 through control finger 55ª, conductor 91, stationary contact terminal 92 and auxiliary bridging disk 104 of the line switch, whence circuit is continued through conductor 105 to the control finger 87. Consequently, the continued energization of the actuating coil of the line switch is ensured, even though the contact segment 84 becomes disengaged from the control finger 87 after the controller leaves its initial operative or "run" position.

However, although the closure of the line switch is thus maintained, the provision of a lifting circuit for the line switch in the first operative position only of the controller is desirable, since, whenever the line switch has been opened, during motor operation, by a backward movement of the controller, as about to be described, the line switch LS should not again be closed until the controller has been returned to its initial operative position "run." In this way, it is ensured that the entire accelerating resistor 98 will be connected in circuit with the vehicle motor or motors before a connection to the supply circuit is effected.

Continued movement of the controller handle in the forward direction operates the entire apparatus as a unit, as previously mentioned, to effect any desired manipulation of the main control circuits, such as the successive short-circuit of sections of the accelerating resistor 98. Since this operation is well-known in the art and, furthermore, since the particular type of system is not material to our present invention, we do not deem it necessary to further illustrate or describe the main circuits.

When it is desired to shut off power, the controller handle is actuated in the reverse direction and finally strikes the right-hand vertical face of the stop member 6. The first actions accomplished by such backward movement of the controller handle are the enforced depression of the latching pin 48 and a reverse travel of the upper dog 16 for an angle of 35°. The dog 16 is alone actuated until the opposite end faces of the interlocking lugs 30 and 31 from those in engagement during forward drum movement come into contact with the confronting end faces of the interlocking lugs 45 and 46 on the lower dog 19. This distance is again preferably 35°, in which event the intermediate control finger 57 occupies a position relative to the lower contact segment 55, as indicated in Figs. 24, 25 and 26 by the legend "Off position, returning". Consequently, the initial backward movement of the controller handle interrupts the circuit of the actuating coil for the line switch LS, which immediately opens and thus takes all the arcing that is caused by such interruption of the main motor circuit.

After the line switch has thus been opened, the lower dog 19 and the "K" controller 14ᵃ may be backwardly rotated as a unit with the upper dog 16 until the extreme position marked "Normal" is again reached, when all of the parts occupy the positions illustrated in Fig. 26.

An important feature of our invention resides in the ease and economy with which "inching" or "jogging" of the motor may be accomplished. In crowded thoroughfares, it is often necessary to continually apply power to, and cut off power from the car motor or motors to produce the enforced low speed; in other words, the motor is "inched" along.

By the use of our switching device, this desirable process may be accomplished by moving only the controller handle and the upper dog 16, thus reducing wear of the main control drum and diminishing the necessary effort of the motorman. It will be observed that, upon a backward movement of 35° of the upper dog 16 from the first or starting notch *a* of the main control drum 14ᵃ, the line switch is opened by reason of the separation of the intermediate finger 57 and the contact block 71. However, the control finger 87 remains in contact with the segment 84, since the "Off position, returning" is (46°—35°)=11° in advance of the "Off position, advancing". See Fig. 24.)

Consequently, by again actuating the controller handle and the upper dog 16 in a forward direction through an angle of 35°, the intermediate finger 57 engages contact block 71, thereby effecting closure of the line switch LS through control finger 87 and segment 84, as previously traced.

This oscillating movement of the controller may be repeated, as desired, to produce "inching" of the motor, without changing the position of the "K" controller 14ᵃ. It should be noted, however, that this result cannot be accomplished unless the "K" controller occupies its initial operative position, thus insuring that the full value of accelerating resistance is connected in circuit with the motor whenever the line switch is closed.

We do not wish to be restricted to the specific circuit connections, structural details or arrangement of parts herein set forth, as various modifications thereof may be effected within the spirit and scope of our invention. We desire, therefore, that only such limitations shall be imposed as are indicated in the appended claims.

We claim as our invention:

1. The combination with a control drum shaft, of an auxiliary contact-carrying device attached to said shaft and having a plurality of lugs of angular dimensions corresponding to a predetermined portion of the travel of the device, a second shaft adapted for manual operation, and a second contact-carrying device mounted on said shaft and having a projection permanently located between the first-named projections to selectively engage them after a predetermined degree of travel in the one or the other direction.

2. The combination with a casing, a control drum located within said casing and having an operating shaft, of an auxiliary contact-carrying device attached to said shaft outside of said casing and having a plurality of upwardly-extending lugs, a second shaft adapted for manual operation and alined with the drum shaft, and a second contact-carrying device mounted on said second shaft and having a depending lug adapted to engage the first-named lug during a certain range of travel.

3. Control apparatus comprising a plurality of alined relatively and individually rotatable members having end surfaces extending transversely to the axis of rotation and a contact device adapted to effect connection between the confronting end surfaces of said members during relative rotatable movement thereof.

4. Control apparatus comprising a plurality of alined relatively and individually rotatable members having a curved face and end faces and provided with contacting surfaces on their curved faces, one of said members also having a contacting surface on an end face and a contact device secured to another member for engaging said end contact surface during relative rotatable movement of said members.

5. Control apparatus comprising a rotatable control member, a plurality of mechanically interlocking members, respectively adapted for manual operation and for attachment to said control member, said interlocking members having a curved face and end faces and provided with contacting surfaces on their curved faces, and a contact device for effecting connection between certain end faces of said members.

6. Control apparatus comprising a plurality of rotatable members having parts capable of interfering and respectively adapted for manual operation and for effecting the arrangement of circuits, said members having curved faces and confronting end faces and said circuits including contact members on the curved faces of said rotatable members and also on the confronting end faces thereof.

7. The combination with a control drum shaft, of an auxiliary contact-carrying device attached to said shaft, a second shaft adapted for manual operation, a second contact-carrying device mounted on said second shaft and adapted to mechanically interlock with the first-named device, said device having confronting end surfaces, and a contacting device located between said contact-carrying devices for effecting connection between the confronting end surfaces thereof.

8. The combination with a control drum shaft, of an auxiliary contact-carrying device attached to said shaft and having end faces and a projection, a second shaft adapted for manual operation, a second contact-carrying device mounted on said second shaft and having end faces and a projection adapted to engage the first-named projection during a certain range of travel, and a contacting device for electrically connecting certain end faces of said contact-carrying devices, said contacting device being located and electrically connected wholly within the boundaries of the contact-carrying devices.

9. The combination with a control drum shaft, of an auxiliary contact-carrying device attached to said shaft and having end faces and a plurality of lugs of angular dimensions corresponding to a predetermined portion of the travel of the device, a second shaft adapted for manual operation, a second contact-carrying device mounted on said second shaft and having end faces and a projection located between the first-named projections to selectively engage them after a predetermined degree of travel in the one or the other direction, and a contacting device located between said contact-carrying devices for effecting connection between the end faces thereof during such travel.

10. The combination with a control drum shaft, of an auxiliary contact-carrying device attached to said shaft and having end faces and a plurality of upwardly-extending lugs, a second shaft adapted for manual operation and alined with the drum shaft, a second contact-carrying device mounted on said second shaft and having end faces and a depending lug adapted to engage the first-named lug during a certain range of travel, and a contact finger secured to the end face of one device for electrically engaging the confronting end face of the other device during such range of travel.

11. The combination with a control drum shaft, of an auxiliary contact-carrying device having end faces and attached to said shaft, a second shaft adapted for manual operation, a second contact-carrying device having end faces and mounted on said second shaft and adapted to mechanically interlock with the first-named device, and a contact finger located between said devices for effecting electrical connection between the end faces thereof only during the period of such interlocking.

12. The combination with a main controller having a plurality of operative positions and a preliminary inoperative position, of an auxiliary switching attachment having a normal position, in advance of said inoperative position, wherein said attachment is mechanically disconnected from said controller, an initial contacting position corresponding to said inoperative position, wherein said attachment is interlocked with said controller, and an operative position effective after the initial operative position of said main controller.

13. The combination with a main controller having a plurality of operative positions and a preliminary "off" position, of an auxiliary switching attachment having a normal position, in advance of said "off" position, wherein said attachment is mechanically disconnected from said controller, an initial contacting position, corresponding to said "off" position, wherein said attachment is interlocked with said controller, and a line-switch-closing position effective after the initial circuit connection in the first operative position of said main controller.

14. The combination with a main controller having a plurality of operative positions and a preliminary inoperative position, of an auxiliary switching attachment comprising one portion having a normal position, in advance of said inoperative position, wherein said attachment is mechanically disconnected from said controller, and comprising a second portion mechanically interlocking with the first-named portion in a position corresponding to said inoperative position, said second portion being further adapted to effect closure of a certain circuit subsequent to the connection of the main controller in that circuit through its first operative position.

15. The combination with a main controller having a plurality of operative positions and a preliminary inoperative position, of an auxiliary switching attachment comprising one portion having a normal position, peripherally located in advance of said inoperative position, wherein said attachment is mechanically disconnected from said controller, and comprising a second portion mechanically interlocking with the first-named portion in a position corresponding to said inoperative position, said second portion being further adapted to effect completion of a certain circuit subsequent to the connection of the main controller in that circuit through its first operative position, and a contact device being located between said portions to continue a predetermined circuit during such mechanical interlocking.

16. The combination with a main controller having a plurality of operative positions and a preliminary "off" position, of an auxiliary switching attachment comprising one rotatable portion having a normal position, peripherally located in advance of said "off" position, wherein said attachment is mechanically disconnected from said controller, and comprising a second rotatable portion mechanically interlocking with the first-named portion during a certain range of travel in a position corresponding to said "off" position, said second portion being further adapted to effect completion of an auxiliary line-switch-closing circuit subsequent to the connection of the main controller in the main line-switch circuit through its first operative position, and a contact device being located between said rotatable portions to continue the line-switch-closing circuit during such mechanical interlocking.

17. Control apparatus comprising a rotatable control member and a plurality of relatively rotatable members respectively adapted for manual operation and for attachment to said control member, said relatively rotatable members being adapted to interlock in either direction after equal degrees of movement.

18. Control apparatus comprising a plurality of rotatable members having interlacing tongues and respectively adapted for manual operation and for effecting the arrangement of circuits, the permissible forward and backward relative movement being the same, and a contact member actuated by one of said rotatable members for respectively making contact and return to an inoperative position when said rotatable members engage in the one and the other direction.

19. Control apparatus comprising a rotatable control member and a plurality of relatively rotatable members respectively adapted for manual operation and for attachment to said control member, said relatively rotatable members being adapted to interlock in either direction after equal degrees of movement, and a contact device located between said rotatable members for respectively making contact and returning to the same inoperative position when said rotatable members interlock in one and the other direction.

20. Control apparatus comprising a plurality of rotatable members having interlacing tongues and respectively adapted for manual operation and for effecting the arrangement of circuits, and means for temporarily locking said members in an engaging position.

21. Control apparatus comprising a plurality of rotatable members having interlacing tongues and respectively adapted for manual operation and for effecting the arrangement of circuits, and a spring-pressed pin in one member adapted to enter a recess in the other member when the tongues meet in a certain direction.

22. Control apparatus comprising a plurality of rotatable members having interlacing tongues and respectively adapted for manual operation and for effecting the arrangement of circuits, a contact member actuated by one of said rotatable members for respectively making and breaking contact when said rotatable members engage in the one and the other direction, and means biased to temporarily restrain relative movement of the rotatable members when engaging in the one direction.

23. Control apparatus comprising a rotatable control member and a plurality of relatively rotatable members respectively adapted for manual operation and for attachment to said control member, said relatively rotatable members being adapted to interlock in either direction, and means for yieldingly restraining further relative movement of said rotatable members when interlocking in the one direction.

24. Control apparatus comprising a rotatable control member and a plurality of relatively rotatable members respectively adapted for manual operation and for attachment to said control member, said relatively rotatable members being adapted to interlock in either direction after equal degrees of movement, and a spring-pressed pin in one member adapted to enter a recess in the other member under interlocking conditions in the one direction.

25. Control apparatus comprising a plurality of alined rotatable members, a contact device adapted to effect connection between the confronting end surfaces of said members, and means biased to temporarily lock said members in the contact-engaging position.

26. Control apparatus comprising two separately mounted rotatable members, said members embodying means for mutually interfering after equal forward and backward relative movement, one of said members having a different degree of initial movement from the other.

27. Control apparatus comprising a plurality of relatively rotatable mechanically interlocking members, the free movement of one member in each direction being the same, and the initial combined movement of said members being greater than said free movement.

28. Control apparatus comprising a plurality of relatively rotatable mechanically interlocking members, the free movement of one member in either direction being less than the initial combined movement of said members, said free movement in one direction being adapted to close a gap in a circuit, and the completion of said combined movement being adapted to complete said circuit, whereby such free movement in the other direction will open said gap while the other member remains stationary.

29. Control apparatus comprising a plurality of rotatable members having interlacing tongues to permit equal free movement of the first member in each direction, the initial combined control step of said members being greater than such free movement, the forward free movement of said first member being adapted to close a gap in a motor-controlling circuit and the completion of said combined movement being adapted to complete said circuit, whereby such free movement in opposite directions will open and close said gap while the second member remains stationary to effect "inching" of the motor being controlled.

30. In a controller, in combination, a plurality of contact fingers, a rotatable drum for engaging the contact fingers, said drum having a plurality of contacting positions, a handle for operating the drum, said handle being disposed for movement relative to the drum and circuit-controlling mechanism comprising a switch disposed for operation when the handle is moved relative to the drum, and means actuated upon the movement of the drum to a predetermined contacting position to cooperate with the switch to effect the control of a circuit through the oscillation of the handle relative to the drum.

31. In a controller, adapted for connection to a source of power through a line switch provided with an independent actuating circuit, in combination, a plurality of contact fingers, a rotatable drum for engaging the contact fingers when set in different positions, a handle for operating the drum, said handle being disposed for movement through a predetermined angle relative to the drum, a switch disposed for actuation through the oscillation of the handle relative to the drum, said switch being connected in the line-switch-actuating circuit, and means actuated by the drum adapted to cooperate with said switch to close the line-switch-actuating circuit when the drum is set in a predetermined contacting position whereby the unrestricted operation of the line switch may be effected through the oscillation of the handle relative to the drum.

32. In a controller adapted to be conted to a source of power supply through a line switch, in combination, a rotatably mounted drum, contact members for engaging the drum when set in a predetermined position, a handle for actuating the drum, said handle being disposed for movement relative to the drum, an auxiliary switch disposed for operation by the handle as it moves relative to the drum, and means mounted for actuation as the drum moves, said means being adapted to cooperate with the auxiliary switch only when the drum is in its initial contacting position to effect the operation of the line switch.

In testimony whereof, we have hereunto subscribed our names this 14th day of May, 1920.

LYNN G. RILEY.
HARRY R. MEYER.
HOWARD H. JOHNSTON.
JAN M. van NIEUKERKEN.